Patented Aug. 9, 1949

2,478,843

UNITED STATES PATENT OFFICE 2,478,843

MINERAL OIL COMPOSITION

Raymond B. Seymour, Chattanooga, Tenn., and Frederic L. Matthews, St. Louis, Mo., assignors to Monsanto Chemical Company, a corporation of Delaware No Drawing. Application February 26, 1946, Serial No. 650,388

4 Claims. (Cl. 252—59)

This invention relates to mineral oil compositions.

An object of this invention is to provide mineral oil compositions having an increased viscosity over ordinary mineral oils. A further object is to provide a lubricating composition having a relatively flat viscosity-temperature relationship. A still further object is to provide a lubricating oil possessing good resistance to shear.

These and other objects are provided by our new mineral oil composition wherein polymerized cyclohexylstyrene in soluble form is combined with a mineral lubricating oil.

According to our discovery, monomeric cyclohexylstyrene is polymerized with or without the application of heat and with or without polymerization catalysts being present to yield a polymer which is soluble in ordinary lubricating oils. We have found that solutions of polycyclohexylstyrene in oils exhibit a decreased temperature coefficient of viscosity over mineral oils which do not contain this material. The viscosity of such solutions has been found to be remarkably resistant to the action of heat. We have also found that polycyclohexylstyrene has a tendency to inhibit the crystallization of naturally occurring waxes present in mineral oils.

Polymerization of cyclohexylstyrene to the oil soluble polymer may be carried out according to any of the usual polymerization methods. These methods involve polymerization in mass, in solution or in aqueous emulsion or suspension.

Suitable catalysts for producing the present polymers are the known oxygen-liberating organic or inorganic peroxides such as benzoyl peroxides, di-tertiary butyl peroxide, tertiary butyl hydroperoxide, potassium persulfate, etc. Acid salts of the Friedel-Crafts type such as anhydrous aluminum chloride, or boron trifluoride may also be employed.

When polymerization is carried out in mass, the polymer is obtained directly as a transparent, glassy resin, of varying degrees of hardness which may be ground, and which product is soluble in mineral lubricating oils. The rate of solution of the polymer in oils may be hastened by heating the oils and by employing vigorous agitation. Usually from 0.1% to 12% by weight of polymer will be found sufficient for most lubricating purposes. Any isomer of cyclohexylstyrene, that is, either ortho-, meta- or para-cyclohexylstyrene may be employed.

When polymerization is carried out in solution the monomeric cyclohexylstyrene is dissolved in a solvent therefor, which solvent may be toluene, xylene, cyclohexane, etc., the solution so formed being heated until a test shows that the monomeric material has been substantially completely converted to the polymeric body. The solution may then be concentrated by the evaporation of the solvent in order to produce a more concentrated solution, which solution may then be added directly to a mineral oil to produce our improved lubricating composition. In some cases the polymerization may be carried out directly in a mineral oil, polymerization being carried out at the desired temperature either with or without a catalyst until the polymeric material has been formed in the mineral oil solution. The mineral oil solution so formed may be used directly as a lubricating composition; however, it is generally more desirable to prepare such a composition of a concentration somewhat in excess of that which is finally desired and then to dilute the solution after polymerization of the cyclohexylstyrene to the point where the desired ultimate concentration has been obtained.

In some cases, where it is desired to obtain the polymeric cyclohexylstyrene in substantially pure form, the solution formed polymer is precipitated from the solution in which it has been produced by pouring the solvent containing the polymer into a non-solvent for the polymer. Suitable non-solvents for polymeric cyclohexylstyrene are the lower alcohols such as methyl, ethyl or propyl alcohol. Upon combining hydrocarbon solutions of the polymer with any of the above alcohols, the polymer is precipitated and may be recovered by filtration, washed free of solvent and precipitant and then dried by exposure to heated air. The polymeric material so obtained is a finely divided, white powder which is readily soluble in mineral lubricating oils.

Emulsion polymerization of cyclohexylstyrene may be carried out by emulsifying the monomeric material in water either with or without an emulsifying agent, but with intensive agitation. The emulsion so formed is heated for a period of time necessary to yield a substantially completely polymerized product. Residual monomeric material if any be present may be removed from the emulsion after polymerization by steam distillation. The emulsion so obtained is broken by the addition of an alcohol or an acid such as sulfuric, phosphoric or acid salts such as aluminum acid sulfate, etc. The precipitated polymer is recovered from the acid treated emulsion by filtration, then washed and dried.

The following examples are provided as further illustrating the principle of our invention. They should not, however, be construed as in any way limiting the scope thereof beyond that required by the appended claims.

*Example 1*

100 g. of para-cyclohexylstyrene was heated in a glass flask at 125° C. for one week. The hard, resinous polymerized para-cyclohexylstyrene was removed from the flask, reduced to a small particle size and then sufficient of the polymeric product was added to xylene to give a 2% by weight solution. The viscosity of this xylene solution was measured and found to be 1.32 centipoises at 25° C. The apparent average molecular weight of this sample, as determined by the elevation of the boiling point of a solution in toluene, was 17,500.

A 3% by weight solution of this same polymeric product was made in two types of oil, viz: a light hydraulic base oil and a heavy lubricating oil, the oils employed having the following properties:

|  | Hydraulic Oil | | Lubricating Oil, Not Heated |
|---|---|---|---|
|  | Before Heating | After Heating |  |
| Vis. at 100° F........cs.. | 3.55 | 4.12 | 119.2 |
| Vis. at 210° F........cs.. | 1.32 | 1.44 | 12.02 |
| Vis. Index............... | 98 | 89 | 98 |
| Slope.................... | 0.83 | 0.82 | 0.87 |

The viscosity properties of the 3% solution prepared as above was determined and found to be as follows:

|  | Hydraulic Oil | | Lubricating Oil, Not Heated |
|---|---|---|---|
|  | Before Heating | After Heating |  |
| Vis. at 100° F........cs.. | 7.95 | 13.47 | 154.4 |
| Vis. at 210° F........cs.. | 5.53 | 4.16 | 32.79 |
| Vis. Index............... | 258 | 222 | 145 |
| Slope.................... | 0.17 | 0.56 | 0.38 |

*Example 2*

100 g. of monomeric para-cyclohexylstyrene was dissolved in 500 cc. of ethyl chloride. 0.1% of aluminum chloride (based on weight of para-cyclohexylstyrene) was added, the addition being made after the cyclohexylstyrene had been cooled to a temperature below −10° C. but above −40° C. The solution so formed was maintained at this temperature for about 30 minutes, after which the product was poured into alcohol, thus precipitating the polymer which was then recovered by filtration and drying. The average molecular weight, as determined by boiling point elevation in toluene, was 15,000.

A 3% solution of a polymer was made in the hydraulic oil employed in Example 1 above, giving a solution of polymer in oil having the following characteristics:

|  | Hydraulic Oil | | Lubricating Oil, Not Heated |
|---|---|---|---|
|  | Before Heating | After Heating |  |
| Vis. at 100° F........cs.. | 6.21 | 7.56 | 191.1 |
| Vis. at 210° F........cs.. | 2.21 | 2.52 | 17.82 |
| Vis. Index............... | 175 | 175 | 108 |
| Slope.................... | 0.64 | 0.64 | 0.62 |

*Example 3*

100 g. of para-cyclohexylstyrene containing 3% of benzoyl peroxide was heated first at 70° C. for one day, then at 100° C. for two days, and then at 125° C. for two days. The hard, polymeric material was then dissolved in the hydraulic oil described in Example 1 above, and viscosity measurements made on the solution so formed. The following values were obtained:

|  | Hydraulic Oil | |
|---|---|---|
|  | Before Heating | After Heating |
| Vis. at 100° F........cs.. | 5.00 | 5.39 |
| Vis. at 210° F........cs.. | 1.77 | 1.86 |
| Vis. Index............... | 137 | 134 |

*Example 4*

100 g. of para-cyclohexylstyrene was heated at a temperature of 125° C. for five days. The polymeric material so obtained had a molecular weight of 2400 as determined by the elevation of the boiling point of toluene. This material was added to samples of hydraulic and of lubricating oils as described in Example 1 above, and viscosity data obtained upon the solution. The data obtained in this manner were as follows:

|  | Hydraulic Oil | | Lubricating Oil | |
|---|---|---|---|---|
|  | Before Heating | After Heating | Before Heating | After Heating |
| Vis. at 100° F.....cs.. | 17.92 | 23.15 | 329.33 | 336.6 |
| Vis. at 210° F.....cs.. | 11.72 | 7.42 | 32.71 | 29.13 |
| Vis. Index............. | 203 | 189 | 124 | 116 |

*Example 5*

50 g. of para-cyclohexylstyrene was added to 100 g. of xylene containing one-half g. of di-tertiary butyl peroxide maintained at the boiling point under a reflux condenser. Refluxing was continued for 5 hours. The polymeric material formed was recovered from the xylene solution by pouring the solution into alcohol, filtering and then drying the resinous precipitate. The precipitate so obtained was then added to the mineral oils described in Example 1 above, with the following results:

|  | Hydraulic Oil | Lubricating Oil |
|---|---|---|
| Vis. at 100° F........cs.. | 5.29 | 167.9 |
| Vis. at 210° F........cs.. | 1.84 | 15.83 |
| Vis. Index............... | 139 | 104 |
| Slope.................... | 0.75 | 0.67 |

*Example 6*

100 g. of para-cyclohexylstyrene containing 1% by weight of benzoyl peroxide was heated at 70° C. for two days. The average molecular weight as determined by the depression of the freezing point in cyclohexane was about 9000.

A sample of the resinous material dissolved in xylene to form a 2% by weight solution had a viscosity of 2.35 centipoises. A 3% by weight solution was prepared in a hydraulic oil and in a lubricating oil, upon which the following viscosity data were obtained:

|  | Hydraulic Oil | Lubricating Oil |
|---|---|---|
| Vis. at 100° F_____cs__ | 11.10 | 295.3 |
| Vis. at 210° F_____cs__ | 3.83 | 27.92 |
| Vis. Index_____ | 237 | 120 |
| Slope_____ | 0.55 | 0.59 |

An important property of the polymeric material resides in its ability to withstand the action of heat when dissolved in oil. In order to evaluate this property the light oil solution of the polymer was heated for 72 hours at a temperature between 120° F. and 125° F. At the end of this heating period the viscosity was again measured.

In the case of the lubricating oil, the oil solution was heated for a period of 72 hours at 342° F., after which heating period the viscosity properties were again measured.

The viscosity index, abbreviated Vis. Index in the above table, is obtained by calculation as described in Method D567-41, published in the ASTM Book of Standards, Part III, 1944, page 273.

While the concept of "viscosity index" has, in part, been widely used as a measure of the viscosity-temperature relationship of a mineral lubricating oil, more recently it is being realized that this concept is not completely descriptive. In view of this changed concept of the viscosity index values for lubricating oils, it is sometimes helpful to use, in addition to the "viscosity index," a simple expression defining the temperature-viscosity relationship as the "slope" of a plot of the temperature-viscosity relationship on semi-log graph paper. The method of plotting the temperature-viscosity relationship is described in ASTM Specification D341-44. It will be realized by those skilled in the art that as far as the "slope" of the viscosity-temperature curve is concerned the desirable "slope" is one having as low a numerical value as is possible.

In the present specification, since both the viscosity index and the slope value are still in widespread use, examples of both values for certain compositions are given.

*Example 7*

0.5% by weight of poly-paracyclohexylstyrene was dissolved in an SAE 10 motor oil and the oil introduced into the crank case of a Lauson test engine. The test was conducted for a total of 36 hours. Samples of oil were removed at the end of 12, 24 and 36 hours and tested for viscosity and neutralization number.

The test results follow:

Oil before test:
 Viscosity 210° F. SUS _____ 45.98
 Viscosity 100° F. SUS _____ 162.1
 Viscosity index _____ 127.7
 Neut. No. _____ Nil
After 12 hrs. operation:
 Viscosity 210° F. SUS _____ 45.60
 Viscosity 100° F. SUS _____ 158.9
 Viscosity index _____ 127.7
 Neut. No. _____ Nil
After 24 hrs. operation:
 Viscosity 210° F. SUS _____ 45.82
 Viscosity 100° F. SUS _____ 162.6
 Viscosity index _____ 126.4
 Neut. No. _____ 0.05
After 36 hrs. operation:
 Viscosity 210° F. SUS _____ 45.98
 Viscosity 100° F. SUS _____ 163.2
 Viscosity index _____ 127.7
 Neut. No. _____ 0.1

The present compositions, while being suitable for general lubricating purposes, may also be used for any purpose for which a liquid composition having an improved temperature-viscosity relationship is edsired. Accordingly, the herein-described compositions are useful in hydraulic mechanisms of various types such as brakes, hydraulic transmissions, pumps and recoil mechanisms, lubrication of gears and turbines, etc.

In view of the stability of the herein-described composition against oxidation and the action of acids, these materials are particularly valuable for general automobile engine lubrication purposes.

What we claim is:

1. A mineral oil having lubricating properties containing an oil-soluble polymerization product of ar-cyclohexylstyrene in amount sufficient to increase the viscosity of said oil.

2. A mineral oil having lubricating properties containing from 0.1% to 12% by weight of polymerized ar-cyclohexylstyrene.

3. A mineral oil having lubricating properties containing as a material for increasing its viscosity a small amount of an oil-soluble polymerization product of para-cyclohexylstyrene.

4. A mineral oil containing a naturally occurring wax in amount sufficient to crystallize upon cooling and in addition a small amount of an oil-soluble polymerization product of ar-cyclohexylstyrene in amount sufficient to inhibit the crystallization of said wax.

RAYMOND B. SEYMOUR.
FREDERIC L. MATTHEWS.

REFERENCES CITED

The following references are of record in the file of this patent:

UNITED STATES PATENTS

| Number | Name | Date |
|---|---|---|
| 1,998,350 | Wueff | Apr. 16, 1935 |
| 2,072,120 | Mikeska | Mar. 2, 1937 |

OTHER REFERENCES

The preparation and polymerization of some alkyl styrenes, by Marvel et al., in the Journal of American Chemical Society, vol. 68, pages 1089 and 1090.